United States Patent

Goodman et al.

Patent Number: 6,090,290
Date of Patent: Jul. 18, 2000

[54] SELENIUM REMOVAL METHODS

[75] Inventors: Donald J. Goodman, Pittsford, N.Y.; Raymond E. Kerollis, Hightstown, N.J.; Albert B. Mindler, Princeton, N.J.; Bruce Bruns, Lawrenceville, N.J.

[73] Assignee: Xerox Corporation, Stamford, Conn.

[21] Appl. No.: 08/186,343

[22] Filed: Jan. 25, 1994

[51] Int. Cl.$^7$ ................ C02F 1/54; C02F 1/70
[52] U.S. Cl. ............ 210/666; 210/681; 210/719; 210/737; 210/912
[58] Field of Search .................. 210/665, 668, 210/669, 681, 684, 685, 719, 757, 912, 666, 737; 423/510; 588/242

[56] References Cited

U.S. PATENT DOCUMENTS

| | | | |
|---|---|---|---|
| 2,835,558 | 5/1958 | Vaaler | 423/510 |
| 3,933,635 | 1/1976 | Marchant | 210/50 |
| 3,950,159 | 4/1976 | Fox et al. | 71/11 |
| 3,966,889 | 6/1976 | Kakuta et al. | 423/510 |
| 4,269,717 | 5/1981 | Slovinsky | 210/750 |
| 4,405,464 | 9/1983 | Baldwin et al. | 210/912 |
| 4,548,800 | 10/1985 | Badesha et al. | 423/510 |
| 4,576,634 | 3/1986 | Badesha et al. | 75/0.5 A |
| 4,678,584 | 7/1987 | Elfline | 210/912 |
| 4,770,700 | 9/1988 | Bertha et al. | 423/510 |
| 4,915,928 | 4/1990 | Marcantonio | 423/510 |
| 4,940,549 | 7/1990 | Olsen et al. | 210/912 |
| 5,089,141 | 2/1992 | Murphy | 210/912 |
| 5,108,624 | 4/1992 | Bossler et al. | 210/668 |
| 5,200,082 | 4/1993 | Olsen et al. | 210/667 |

OTHER PUBLICATIONS

Wiltsey, "Carbohydrazide As A Hydrazine Replacement—Improved Feedwater Quality With Life Extension Benefits," Paper Presented At The Missouri Valley Electric Association Engineering Conference, Apr. 30, 1986.

Nalco Chemical Company, "Questions and Answers, ELIMIN-OX®, Total System Protection," Bulletin 23 (1992).

Primary Examiner—Ivars Cintins
Attorney, Agent, or Firm—Zosan S. Soong

[57] ABSTRACT

A method for removing selenium from waste water is disclosed comprising reducing selenium oxide with carbohydrazide in a solution comprised of the selenium oxide to form elemental selenium.

4 Claims, 1 Drawing Sheet

SELENIUM REMOVAL METHODS

This invention relates generally to the removal of selenium from a waste solution, and more particular pertains to the use of carbohydrazide as a reducing agent to precipitate out elemental selenium from a waste solution. In embodiments, the present invention is directed to the recovery of selenium from waste solutions.

Selenium contaminated waste solution is generated from a variety of industrial processes, including for example from the production of trigonal selenium and the generation of selenium and selenium alloys. Trigonal selenium may be used in the fabrication of photosensitive or photoconductive members. Selenium contaminated waste solution may be considered hazardous waste in some instances and may be barred from discharge into municipal sewage lines. It may be then necessary to ship the waste solution elsewhere for disposal, perhaps at considerable cost. There is a need for new selenium removal methods to treat waste solutions so that these solutions are no longer considered hazardous waste and can be discharged into municipal sewage lines. Also, there is a need to recycle the selenium from the waste solutions.

Olsen et al., U.S. Pat. No. 5,200,082, discloses a selenium removal method employing a reducing agent such as finely powdered iron to reduce selenium.

Badesha et al., U.S. Pat. No. 4,576,634, discloses reducing agents including hydrazine in col. 5 to form a selenium arsenic alloy product.

Slovinsky, U.S. Pat. No. 4,269,717, discloses the use of carbohydrazide as a boiler additive for oxygen scavenging.

Kakuta et al., U.S. Pat. No. 3,966,889, discloses a process for the recovery of selenium from waste gas.

Marchant, U.S. Pat. No. 3,933,635, discloses a method for selenium removal from a solution which uses a metallic reducing agent such as zinc to precipitate elemental selenium.

Wiltsey, "Carbohydrazide as a Hydrazine Replacement—Improved Feedwater Quality With Life Extension Benefits," Paper presented at the Missouri Valley Electric Association Engineering Conference, Apr. 30, 1986, discloses the use of carbohydrazide and hydrazine as boiler additives for oxygen scavenging.

Nalco Chemical Company, "Questions and Answers, ELIMIN-OX™, Total System Protection," Bulletin 23 (1992), discloses the use, properties, and toxicology of ELIMIN-OX™ (a composition containing carbohydrazide) versus hydrazine.

SUMMARY OF THE INVENTION

It is an object of the present invention to provide methods for selenium removal from waste solution which employs a reducing agent such as carbohydrazide that is significantly less toxic than hydrazine.

It is a further object in embodiments to provide a selenium removal method which precipitates elemental selenium, which can be recycled.

It is an additional object in embodiments to minimize the selenium level in waste solutions such that treated waste solutions are no longer considered hazardous waste.

It is another object in embodiments to provide a selenium removal method which allows the treated waste solution to be discharged directly into municipal sewage lines and minimizes or eliminates the need for special disposal procedures.

It is also an object in embodiments to recover selenium, especially elemental selenium.

These objects and others are accomplished in embodiments by providing a method comprising reducing selenium oxide with carbohydrazide in a solution comprised of the selenium oxide and wherein elemental selenium results.

In embodiments, there is also provided a method for removing selenium from a waste solution comprising selenium oxide and sodium, wherein the method comprises:

(a) reducing the sodium content to less than about 500 ppm;

(b) reducing the selenium oxide with carbohydrazide after (a) to precipitate elemental selenium;

(c) heating the solution to a temperature ranging from about 150 to about 250° F. during the reduction of the selenium oxide;

(d) optionally adjusting the pH of the solution to a value ranging from about 2 to about 4 prior to the reduction of the selenium oxide; and (e) recovering the elemental selenium.

BRIEF DESCRIPTION OF THE DRAWINGS

Other aspects of the present invention will become apparent as the following description proceeds and upon reference to FIG. 1 which represent preferred principal steps in the selenium removal process.

DETAILED DESCRIPTION

Figure 1:
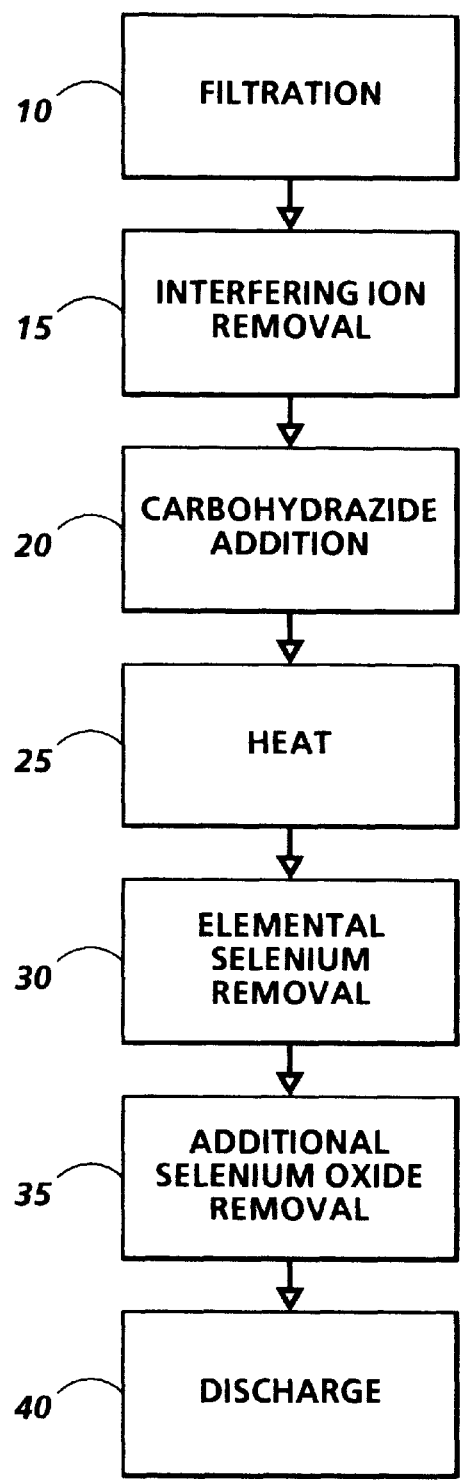

The term "selenium" as used herein generally refers to all compounds of this element including for instance selenite and selenate, as well as the elemental form. However, specific forms of selenium are indicated by the following phrases: "trigonal selenium," "elemental selenium," and "selenium oxide." The phrase "selenium oxide" includes sodium selenite ($Na_2SeO_3$) and sodium selenate ($Na_2SeO_4$). The phrase "trigonal selenium" refers to that specific crystalline form of elemental selenium.

The present invention may be used to remove selenium from any selenium containing solution, especially waste solution resulting from the production of trigonal selenium. Waste solution from the production of trigonal selenium typically comprises water, sodium hydroxide, elemental selenium, selenium oxide which may be in the form of sodium selenite and sodium selenate, and traces of peroxide and its stabilizers such as acetanilide and stannous phosphate. The sodium hydroxide may be for instance 4% NaOH. Illustrative concentration ranges of the components of the waste solution are as follows: a sodium hydroxide level ranging from about 30,000 to about 65,000 ppm, and especially about 40,000 ppm; a sodium selenite level ranging from about 1,000 to about 5,000 ppm, and especially about 3,000 ppm; a sodium selenate level ranging from about 50 to about 400 ppm, and especially about 200 ppm; an elemental selenium level ranging from 0 to about 5 ppm, and especially about less than 1 ppm; a peroxide and peroxide stabilizer level ranging from 0 to about 10 ppm, and especially from about 1 about 5 ppm; and a water level ranging from about 80 to about 98% by weight, and especially about 93% by weight. Total dissolved solids in the waste solution prior to employment of the present invention may range for example from about 30,000 to about 150,000 ppm, preferably from about 50,000 to about 90,000 ppm, and especially about 70,000.

In FIG. 1, the waste solution may first optionally undergo filtration step 10. Any appropriate filter may be used, including for instance a bag or cartridge filter such as a Rosedale Model 223-0299 which may have for example a 10 micron pore size. Filtration may remove particulates including for example elemental selenium. Filtration may remove a portion or all of the particulates such as from about 70% to 100%.

After optional filtration step 10, it is preferred that interfering ions, which may interfere with the reduction of the selenium oxide, are removed from the waste solution in step 15. As used herein, the term "ion" or "ions" includes disassociated ions and complexed ions. It is believed that an excessive amount of the interfering ions interferes with the reduction of the selenium oxide by the carbohydrazide. An excessive amount of the interfering ions is believed to be above 5,000 ppm and thus interfering ion removal step 15 reduces the ion level to a concentration less than 5,000 ppm, preferably ranging from about 500 to about 3,000 ppm, and particularly from about 1,000 to about 2,000 ppm. Illustrative examples of the interfering ions include alkali metals such as potassium, lithium rubidium, cesium, and sodium, both disassociated ions and complexed to anions such as hydroxide, selenite, and selenate. Interfering ion removal may be effected in one, two, three,or more stages. In preferred embodiments, the waste solution passes through first a weak acid cation exchange column and then a strong acid cation exchange column to remove for example sodium. It is believed that the weak acid cation exchange column removes primarily for example the sodium ion from NaOH (whereby the NaOH may be exchanged to become for example $H_2O$) and that the strong acid cation exchange column removes primarily for example the sodium ion from sodium selenium oxide (whereby the sodium selenium oxide may be exchanged to become for example $H_2SeO_3$ and $H_2SeO_4$).

Ion exchange materials, processes, and apparatus, including those for weak acid cation exchange and strong acid cation exchange, are known, and are described for example in "Kirk-Othmer Encyclopedia of Chemical technology," Vol. 13, pp. 678–705 (Third Edition 1981), the disclosure of which is totally incorporated by reference. The weak acid, cation-exchange resins may be based on acrylic or methacrylic acid that has been cross-linked with a difunctional monomer, e.g., divinylbenzene. The manufacturing process may start with the ester of the acid in suspension polymerization, followed by hydrolysis of the resulting product to produce the functional acid group. Other weak acid resins may be made with phenolic or phosphonic functional groups. Strong acid resins for strong acid cation exchange include sulfonated copolymers of styrene and divinylbenzene.

To regenerate the cation exchange columns preferably employed in step 15, the columns may be washed with any suitable acid solution such as 4% sulfuric acid to remove the interfering ions, such as sodium ions, bound to the columns. The regeneration solution after passing through the columns typically is at least substantially free of selenium, such as below 1 ppm, and may be discharged in discharge step 40 discussed below. The regeneration solution optionally may undergo any of the step described herein for additional selenium removal.

Subsequent to the preferred sodium removal step 15, carbohydrazide is added to the waste solution in step 20, preferably with mixing, in an effective amount. Carbohydrazide may be added in stoichiometric excess as compared with the selenium oxide (including both $SeO_3$ and $SeO_4$), preferably at least 2 moles of the carbohydrazide per mole of the selenium oxide, and more preferably from about 4 to about 8 moles of the carbohydrazide per mole of the selenium oxide. Carbohydrazide is water soluble and may be used in either dry powdered form or in solution form. In a preferred embodiment, the added carbohydrazide is in a water solution of 5% by weight.

While carbohydrazide may be used alone, it may be optionally catalyzed. For this purpose, it is desirable to use catalysts which undergo oxidation-reduction reactions. For example, hydroquinone and other quinones can be used to catalyze the carbohydrazide. Another catalyst may be cobalt, preferably in a stabilized form. Typical useful stabilized cobalt complexes are described in the following U.S. Pat. Nos., which are hereby totally incorporated by reference: 4,012,195; 4,022,711; 4,022,712; 4,026,664; and 4,096,090. An effective amount of one, two, or more catalysts may be used. Preferably, the optional catalyst(s) may be added in an amount ranging from about 0.2 to about 20% by weight of the carbohydrazide.

Carbohydrazide has the formula $(NH_2NH)_2CO$. Other names for carbohydrazide are believed to include carbazide, carbodihydrazide, carbonohydrazide, and N,N'-diaminourea. Carbohydrazide is available for example as ELIMIN-OX™ from the Nalco Chemical Company.

During reduction of the selenium oxide by carbohydrazide, the selenium oxide is reduced to elemental selenium, which typically precipitates. It is believed that at least about 90% of the selenium oxide is reduced to elemental selenium. It is also believed that the precipitated elemental selenium is in the amorphous form, although a small portion may be crystalline. The carbohydrazide is typically oxidized to carbon dioxide gas (which may be vented), nitrogen gas (which may be vented), and water.

Prior to, during, and/or subsequent to addition of carbohydrazide to the waste solution, the waste solution is preferably heated in step 25 at an effective temperature for an effective period of time to promote growth of the elemental selenium particles which result from the reduction of the selenium oxide by the carbohydrazide. This is to facilitate the eventual removal of the elemental selenium particles. In embodiments, the waste solution is heated prior to and/or during reduction of the selenium oxide. The waste solution may be heated to a temperature ranging for example from about 150 to about 250° F., and preferably from about 180 to about 220° F. and especially about 200° F. Heating step 25 occurs for a time period ranging for example from about 30 minutes to about 12 hours, and preferably from about 2 hours to about 8 hours, and especially about 3 hours.

In embodiments, the waste solution prior to carbohydrazide addition step 20 may have a pH such as below 2 or above 4. In embodiments, a pH above 4 may not promote reduction of the selenium oxide. Thus, prior to, during, and/or subsequent to addition of carbohydrazide to the waste solution, the pH of the waste solution is preferably adjusted to an effective pH to promote reduction of the selenium oxide. In embodiments, the pH of the waste solution may be adjusted prior to and/or during reduction of the selenium oxide. The pH of the waste solution may be adjusted to a pH ranging for example from about 2 to about 4, and especially about 3. Any suitable acid and base may be employed to adjust the pH of the waste solution including sodium hydroxide and sulfuric acid.

The elemental selenium, which may be precipitated out of solution during reduction of selenium oxide, may be removed or recovered in step 30 by any appropriate methods and apparatus. For example, a filter press or bag filter (e.g., a Shriver Filter Press available from EIMCO Process Equipment Company) may be employed. Typically, about 5 to about 10 lbs, preferably about 7.5 lbs, of elemental selenium is collected per batch of waste solution. Each batch of waste solution may range in volume for example from about 500 to about 1000 gallons, and especially about 650 gallons.

Subseqent to carbohydrazide addition step 20 and elemental selenium removal step 30, the selenium concentration may range for example from about 10 to about 80 ppm, preferably from about 20 to about 40 ppm, and especially about 30 ppm. Additional selenium oxide may be removed in step 35, wherein step 35 preferably reduces the selenium concentration to less than 10 ppm, and more preferably less than about 1 ppm. Step 35 may comprise one, two, three or more stages. In preferred embodiments of additional selenium oxide removal step 35, the waste solution may be passed through for example an anion exchange column to bind selenium oxide to the column. The column preferably is a strong base anion exchange column.

Ion exchange materials, processes, and apparatus, including those for anion exchange such as strong base, anion exchange, are known, and are described for example in "Kirk-Othmer Encyclopedia of Chemical technology," Vol. 13, pp. 678–705 (Third Edition 1981), the disclosure of which is totally incorporated by reference. The ability of the weak base resins to sorb acids depends on their own basicity and the pK of the acid involved. A variety of base strengths are obtained depending on the nature of the amine functionality. Primary, secondary, and tertiary amine functionality, or mixtures of them, can be put into various structures ranging from epichlorohydrin-amine condensates and acrylic polymers, to styrene-divinylbenzene copolymers. Strong base, anion exchange resins, especially those based on styrene-divinylbenzene copolymer, are classed as type I and type II. Type I is a quaternized amine product made by the reaction of trimethylamine with the copolymer after chloromethylation with chloromethyl ether. Type II functionality may be obtained for example by the reaction of the styrene-divinylbenzene copolymer with dimethylethanolamine. Quaternary amine functionality may be introduced into pyridine and acrylate polymers.

The anion exchange column which may be used in additional selenium oxide removal step 35 can be regenerated by washing the column with for example 4% NaOH to remove selenium oxide bound to the column. The regeneration solution after passing through the column will typically comprise selenium and the regeneration solution may then be considered waste solution which can undergo the steps described herein to minimize the selenium concentration.

After the treatment steps described herein, the waste solution may be discharged in step 40 into municipal sewage systems. In embodiments, the pH of the waste solution may be adjusted prior to discharge step 40 to meet local, state, and/or federal environmental standards. For example, the pH of the waste solution may be adjusted to a pH ranging from about 6 to about 9 using any of the bases and acids described herein.

The invention will now be described in detail with respect to specific preferred embodiments thereof, it being understood that these examples are intended to be illustrative only and the invention is not intended to be limited to the materials, conditions or process parameters recited herein. All percentages and parts are by weight unless otherwise indicated. The selenium content may be determined by any appropriate method and apparatus including for example a spectrophotometer.

I. Ion Exchange Resin Pretreatment

1. Weak Acid Cation Resin Treatment

Fifty-five gallons of raw wastewater (comprising for instance water, sodium hydroxide, elemental selenium, and selenium oxide) resulting from the production of trigonal selenium, having a pH of about 12.5, was treated through 3.5 ft$^3$ of weak acid cation resin in the hydrogen form, i.e., passed through the weak acid cation resin. Prior to this treatment, the weak acid cation resin was thoroughly rinsed with water and backwashed. The weak acid cation resin was RESINTECH™ WACMP (polymer structure: acrylic/divinylbenzene; functional group R(COOH)) available from RESINTECH, INC.

During the run, various cuts or portions were taken and analyzed for Total Selenium content. The results are detailed below:

| Volume Treated, gals | Total Selenium, ppm |
| --- | --- |
| 0–5 | rinse, discarded |
| 10–15 | 1,740 |
| 15–20 | 4,300 |
| 25–30 | 4,800 |
| 35–40 | 4,400 |
| 45–50 (begin water rinse) | 3,900 |
| 50–55 | 140 |
| 55–60 | 34 |
| 65–70 | <10 |
| 70–75 | <1.0 |
| Composite of 75 gallons | 2880 |

The composite sample of 75 gallons had the following characteristics:

pH: 3.86

Total Selenium: 2880 ppm

TDS: 4300 ppm

Sodium: 540 ppm

The capacity of the resin utilizing sulfuric acid as the regenerant was 61.3 Kgr./ft$^3$.

It was also determined that surfactants/detergents remaining in the weak acid cation resin after manufacturing may interfere with the reduction reaction and prevent the formation of the black elemental selenium precipitate. Preconditioning of new resin by rinsing for example with sulfuric acid or dilute alkali such as dilute NaOH solution (e.g., 10% or less NaOH) may be required before use to remove the surfactant/detergent from the resin.

2. Strong Acid Cation Resin Treatment

A portion of the weak acid resin effluent having a pH of about 3.86 was treated through a column of strong acid cation resin operated in the hydrogen form. The strong acid cation resin was RESINTECH™ CG-8H (polymer structure: styrene crosslinked with divinylbenzene; functional group RSO$_3$H) available from RESINTECH, INC. During the run, various cuts or portions were taken and analyzed for Total Selenum content. The results are detailed below:

| Fraction, ml | Sodium, ppm | Total Selenium,ppm |
| --- | --- | --- |
| #1: 500 | 2.6 | 1370 |
| #2: 500 | 2.2 | 3450 |
| #3: 650 | 1.0 | 3690 |
| #4: 550 | 1.6 | 670 |
| #5: 550 | 0.9 | 45 |

A composite sample was prepared by mixing Fractions #1–4. The total selenium level in the composite was 2350 ppm, the pH was 2.56, and the average sodium concentration was less than about 2.0 ppm. The capacity of the strong acid cation resin using sulfuric acid as the regenerant was 20.2 Kgrs./ft$^3$.

II. Carbohydrazide Reduction Reactions

A. Constant Carbohydrazide Dosage, Varying pH

A series of examples were conducted using carbohydrazide mixed as a 5% solution in water. The amount of carbohydrazide was kept constant at 4.4 times stoichemetric for all reactions. The final pH was varied to determine the optimum reaction pH. The pH was varied by adding HCl. The strong acid cation effluent contained 2160 ppm total selenium and a pH 2.40. All examples utilized 100 ml of cation exchange effluent. The results are detailed below:

| Init. pH | pH after carbohydrazide addition | Adj. pH | Final pH | Total Se |
|---|---|---|---|---|
| 2.40 | 4.09 | 4.00 | 6.43 | 157 |
| 2.40 | 4.10 | 3.50 | 4.33 | 39 |
| 2.40 | 4.13 | 3.00 | 3.09 | 29 |

B. Constant pH, Varying Carbohydrazide

A series of examples were performed using the 5% carbohydrazidide in varing stoichemetric amounts at a constant pH=3.5. The strong acid cation effluent contained 2160 ppm total selenium and a pH=2.40. All examples utilized 100 ml of cation exchange effluent. The results of these examples are detailed below:

| X Stoichem | pH after carbohydrazide addition | Adj. pH | Final pH | Total Se |
|---|---|---|---|---|
| 3.0 | 3.54 | 3.50 | 6.22 | 212 |
| 3.5 | 3.73 | 3.50 | 5.18 | 109 |
| 4.0 | 3.88 | 3.50 | 4.90 | 64 |

III. Strong Base Anion Exchange Resin Polishing

Examples were conducted to determine the effectiveness of using a strong base anion exchange resin to further reduce the selenium levels in the filtrate from the reduction reaction. Examples were conducted with both HCl and $H_2SO_4$ pH adjusted reductant solutions. This was done to determine the effect of monovalent chloride ion versus divalent sulfate ion on the selectivity of the strong base anion resin for selenium. The strong base anion resin was RESINTECH™ SBG1P (polymer structure: styrene crosslinked with divinylbenzene; functional group $RN(CH_3)_3OH$) available from RESINTECH, INC. The results are presented below:

HCl Used for Reduction Reaction pH Adjustment

1. Influent selenium=4.9 ppm Average selenium in effluent=<10 ppb

2. Influentselenium=150ppm Average selenium in effluent=23 ppb $H_2SO_4$ Used for Reduction Reaction pH Adjustment 1. Influent selenium=1 1 ppm Average selenium in effluent=50 ppb The strong base anion resin was regenerated with a 4% NaOH solution. The capacity of the strong base anion resin was determined to be 12.0 Kgrs./ft$^3$. This data indicated that the strong base anion resin will very effectively and consistently reduce the effluent total selenium levels to less than 100 ppb. The data suggested that the sulfate ion from the $H_2SO_4$ may interfere to some extent with the removal of the selenium oxide by the strong base anion exchange resin.

Other modifications of the present invention may occur to those skilled in the art based upon a reading of the present disclosure and these modifications are intended to be included within the scope of the present invention.

What is claimed is:

1. A method of removing selenium from a waste solution including selenium oxide comprising reducing the selenium oxide with carbohydrazide, thereby precipitating elemental selenium, wherein the solution comprises an alkali metal, and the method further comprises reducing the alkali metal content of the solution prior to the reduction of the selenium oxide.

2. A method of removing selenium from a waste solution including selenium oxide comprising reducing the selenium oxide with carbohydrazide, thereby precipitating elemental selenium, wherein the solution comprises sodium, and the method further comprises reducing the sodium content of about 30,000 ppm to about 100,000 ppm to less than about 500 ppm prior to the reduction of the selenium oxide.

3. A method for removing selenium from a waste solution comprising selenium oxide and sodium, wherein the method comprises:

(a) reducing the sodium content to lessthan about 500 ppm;

(b) reducing the selenium oxide with carbohydrazide after (a) to precipitate elemental selenium;

(c) heating the solution to a temperature ranging from about 150 to about 250° F. during the reduction of the selenium oxide;

(d) optionally adjusting the pH of the solution to a value ranging from about 2 to about 4 prior to the reduction of the selenium oxide; and (e) recovering the elemental selenium.

4. A method of removing selenium from a waste solution including selenium oxide and sodium comprising:

(a) passing the solution through a weak acid cation exchange column and a strong acid cation exchange column prior to (b) to minimize the sodium level; and (b) reducing the selenium oxide with carbohydrazide, thereby precipitating elemental selenium.

* * * * *